Patented Jan. 16, 1923.

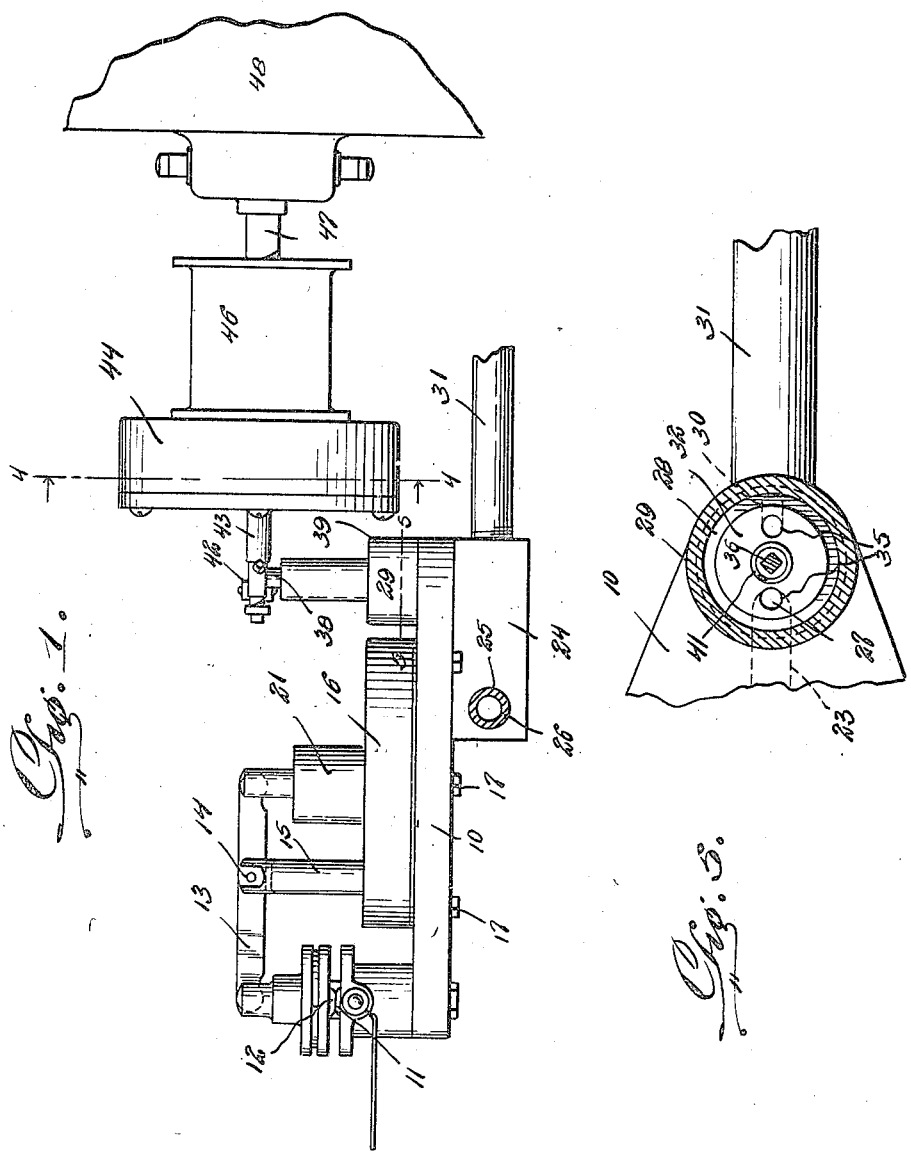

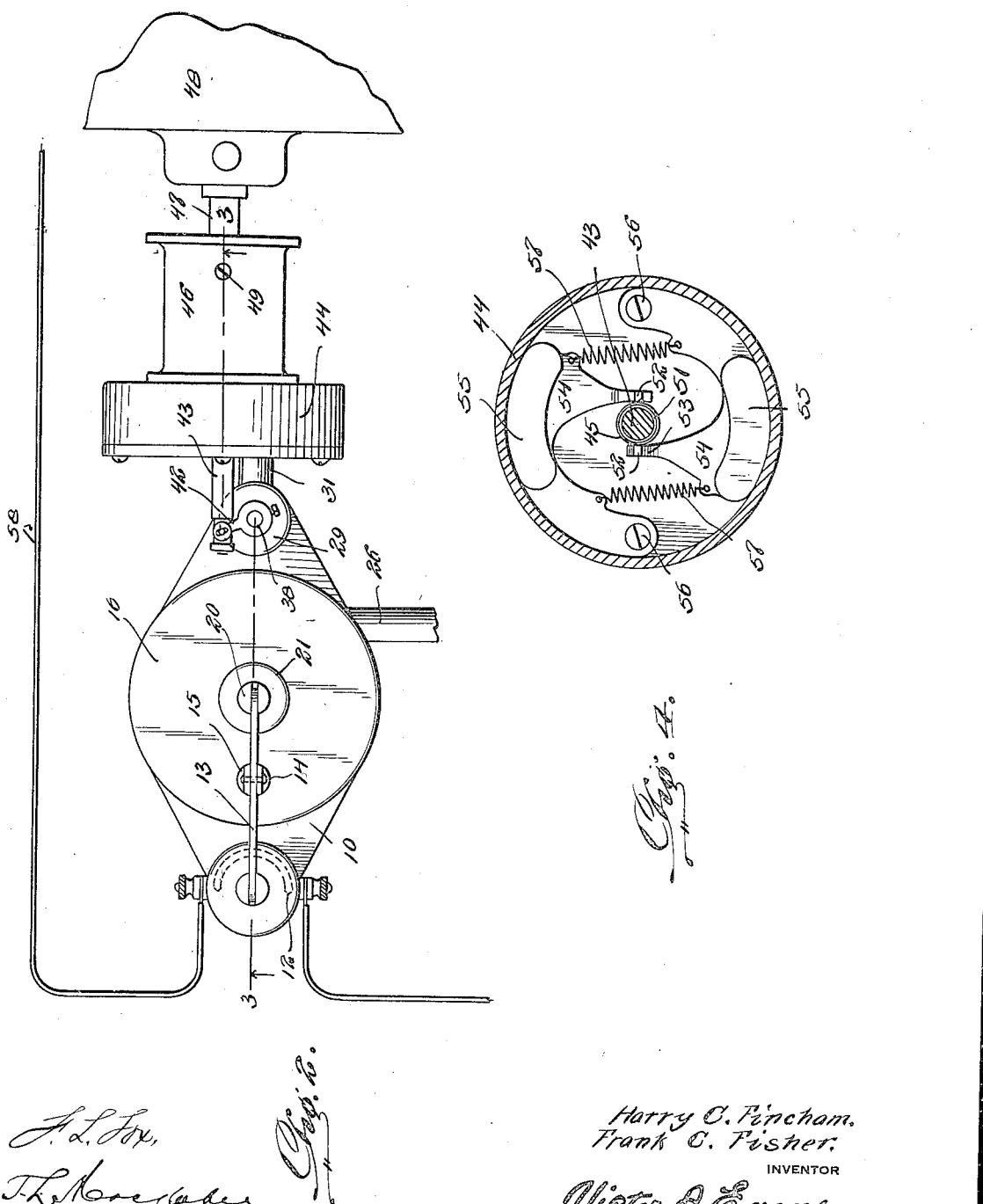

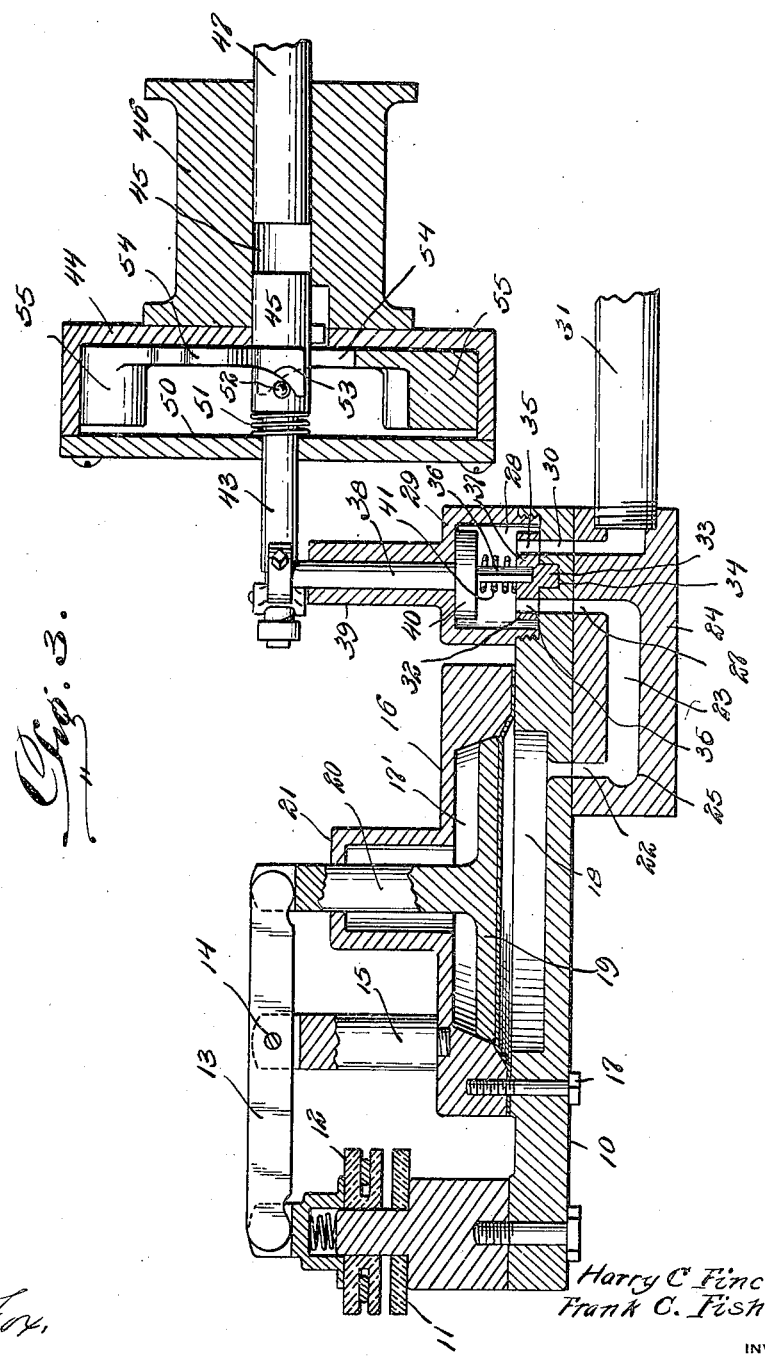

1,442,658

UNITED STATES PATENT OFFICE.

HARRY C. FINCHAM AND FRANK C. FISHER, OF TOLEDO, OHIO.

AUTOMATIC CONTROL.

Application filed April 19, 1921. Serial No. 462,773.

*To all whom it may concern:*

Be it known that we, HARRY C. FINCHAM and FRANK C. FISHER, citizens of the United States, residing at Toledo, in the county of Lucas and State of Ohio, have invented new and useful Improvements in Automatic Controls, of which the following is a specification.

This invention relates to controlling devices especially designed for use in connection with domestic refrigerating plants.

In most plants of this character, it is important that the operation of the motor be stopped in the event of the supply of water to the ammonia pump and coils being interrupted or reduced, and it is the purpose of the present invention to provide means controlled by such water supply for automatically interrupting the water circuit in such case and to automatically reestablish the circuit when the supply of water again reaches normal. It is further important that no water be supplied to the pump and coils, unless the motor is operating.

For this purpose, the invention aims to provide a novel form of pressure controlled switch for controlling the motor circuit and a novel form of motor operated valve, with means whereby the operation of the motor will automatically close the valve and automatically open the same when the operation of the motor is resumed.

With the above and other objects in view, the invention further includes the following novel features and details of construction, to be hereinafter more fully described, illustrated in the accompanying drawings and pointed out in the appended claims.

In the drawings:—

Figure 1 is an elevation showing a portion of a motor with the invention in position.

Figure 2 is a top plan view of the same.

Figure 3 is a longitudinal sectional view on the line 3—3 of Figure 2.

Figure 4 is a section on the line 4—4 of Figure 1.

Figure 5 is an enlarged section on the line 5—5 of Figure 1.

Referring in detail to the drawings, wherein like characters of reference denote corresponding parts, the reference character 10 indicates a base, which may be supported by any suitable means. Supported upon one end of this base is an electric switch which includes a stationary contact 11 and a movable contact 12, the latter being controlled by a lever 13, which is pivotally mounted as indicated at 14 upon a standard 15, the latter being supported upon the base 10.

The base 10 is formed preferably in separate sections and includes a section 16 which is secured to the base proper by means of screws or similar fastening devices 17. The section 16 may be removed if desired. Formed in the section 16 of the base is a chamber 17', the latter extending into the base proper as shown at 18. Operating within this chamber is a piston or diaphragm 19, which is provided with a standard 20. This standard is guided in an opening in the extension 21 carried by the section 16 and extends through this opening beneath the end of the lever 13 which is remote from that end of the lever engaging the revoluble contact 12.

Extending from the lower part of the chamber 17 is a passage 22, the latter extending downwardly and communicating with a passage 23 provided in a section 24 which also forms a part of the base 10. The passage 23 is in communication with an opening 25, within which is secured one end of a supply pipe 26 which is adapted to supply water to the coils and pump of a refrigerating apparatus.

Also communicating with the passage 23 is a relatively small passage 27, which extends into a chamber 28 formed in a section 29 secured to the base 10. An additional passage 30 extends from this chamber and communicates with one end of a pipe 31 which leads to the coil and pump for the purpose of supplying water thereto. Located within the chamber 28 is a valve member 32 which has extending downwardly therefrom a pintle 33, the latter rotating within a socket 34 formed in the base 10. The valve member 32 is provided with oppositely disposed openings or passages 35 which are adapted to be moved into and out of register with the passages 27 and 30 when the valve is rotated. For the purpose of operating this valve there is provided a rectangular pin 36, which has one end disposed within a similarly located socket 37 formed in the upper face of the valve member 32. This pin is carried by a rock shaft 38, which has a bearing provided in an extension 39 of the section 29 and carries at its lower end a disk 40 which abuts the inner or lower face of the top wall of the chamber 28. A spring 41 surrounds the pin 36 so as to hold the valve member 32 in close contact with the bottom of the chamber 28.

The upper outer end of the rock shaft 38 is provided with an arm 42, whose outer end is engaged with a shaft 43. This shaft is mounted for rotation in a casing 44 and extends through said casing and has a sliding bearing within a socket 45 formed in a coupling member 46. The member 46 serves to connect the shaft 43 with the shaft 47 of a motor 48, the said shaft 47 being positively connected within the coupling member 46 as shown at 49, while the shaft 43 rotates with said member but is permitted a longitudinal sliding movement as stated. Mounted upon the shaft 43 within the casing 44 is a collar 45 and positioned upon this shaft between the collar and the adjacent inner wall of the casing 50 is a spring 51, which acts to normally force the shaft 43 inward or in a direction toward the motor 48. When in this position the shaft 43 will through the connections just described, move the valve member 32 so that the openings or passages 35 are out of register with the passages 27 and 30 and the flow of water through the chamber 28 interrupted.

In order to move the valve member 32 to a position to reestablish this flow, the collar 50 is provided with oppositely extending pins 52, which are adapted to ride over cam surfaces 53 formed upon arms 54 which are carried by weights 55, located within the casing 44. These weights are mounted for pivotal movement as shown at 56 and are retracted or moved inward toward the center of the casing 44 by means of springs 57 which connect the said weights, but are permitted to move outward against the action of these springs by centrifugal action due to the rotation of the shaft 43 when the motor 48 is operated.

The motor is connected to the movable contact member by means of a conductor 58.

In the operation of the invention water is supplied to the coils and pump from a suitable source through the pipe 26 and enters the passage 23 and through the passage 22, the chamber 18, the pressure of the water within this chamber forcing the piston or diaphragm 19 upward and its stem 20 outward so as to cause the movable contact 12 to engage the stationary contact 11 and close the switch to the motor circuit. The motor is then operated to rotate the shaft 43, whereupon the weights 55 under centrifugal action will cause the pins 52 to ride upon the cam surfaces 53 of the arms 54 and force the shaft 43 outward. Through the connection of the arm 42 between the shaft 43 and the rock shaft 38, the valve member 32 will be operated to bring into register the openings or passages 35 and the passages 27 and 30. Water will then also flow through these passages to the pipe 31 and the coils and pump of the refrigerating apparatus or other device. When the flow of water is interrupted or reduced so that the pressure within the chamber 17 is not sufficient to maintain the piston or diaphragm 19 in elevated position, the latter will fall, so that the contact members 11 and 12 will be separated and the flow of current to the motor 48 interrupted. The motor will then stop and the springs 57 will move the weighted members 55 inward toward one another, permitting the pins 52 to ride over the cam surfaces 53 under the action of the spring 51 and the shaft 43 will be moved inwardly. This will rotate the valve member 32 to close the passages 27 and 30 and interrupt the flow of water to the coils and pump.

The invention is susceptible of various changes in its form, proportions and minor details of construction and the right is herein reserved to make such changes as properly fall within the scope of the appended claims.

Having described the invention what is claimed is:—

1. The combination with a motor operated apparatus including a water supply, of means controlled by the supply of water for controlling the operation of the motor and means controlled by the operation of the motor for interrupting or reestablishing the flow of water.

2. The combination with a motor operated refrigerating apparatus and a water supply, of means controlled by the water supply for controlling the operation of the motor, whereby the latter will be stopped when the water supply is interrupted and operated when the water supply is reestablished and means controlled by the operation of the motor for controlling the flow of water.

3. The combination with a motor operated apparatus including a water supply, of an electric switch, means controlled by the supply of water for operating the switch to control the operation of the motor and means controlled by the operation of the motor for interrupting or reestablishing the flow of water.

4. The combination with a motor operated apparatus including a water supply, of an electric switch, a water operated piston for actuating the switch to control the operation of the motor and means controlled by the operation of the motor for interrupting or reestablishing the flow of water.

5. The combination with a motor operated apparatus including a water supply, of means controlled by the water supply for controlling the operation of the motor, a valve for controlling the water supply and means whereby the operation of the motor will actuate the valve to control the passage of water therethrough.

6. The combination with a motor operated apparatus including a water supply, of means controlled by the water supply for controlling the operation of the motor, a valve for controlling the water supply, said valve including a casing having passages therein, a rotary valve disk located within the casing and having openings therein adapted to be brought into and out of register with said passages and means whereby the valve will be automatically opened when the motor is in operation to permit of the passage of water through the valve and automatically closed when the motor stops.

7. The combination with a motor operated apparatus including a water supply, of means controlled by the water supply for controlling the operation of the motor, a valve for controlling the water supply, said valve including a casing having passages therein, a rotary valve disk located within the casing and having openings therein adapted to be brought into and out of register with said passages and means including a centrifugally operated longitudinally movable shaft connected to the valve for automatically opening the latter when the motor is in operation to permit of the passage of water through said valve and automatically closed when the motor stops.

In testimony whereof we affix our signatures.

HARRY C. FINCHAM.
FRANK C. FISHER.